(12) United States Patent
Mori (10) Patent No.: US 7,674,138 B2
(45) Date of Patent: Mar. 9, 2010

(54) CONNECTIVITY HUB WITH AN INTEGRATED CLIP

(75) Inventor: Kenneth Mori, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 0 days.

(21) Appl. No.: 11/948,967

(22) Filed: Nov. 30, 2007

(65) Prior Publication Data

US 2008/0133806 A1 Jun. 5, 2008

Related U.S. Application Data (60) Provisional application No. 60/868,258, filed on Dec. 1, 2006.

(51) Int. Cl.
*H01R 13/502* (2006.01)
(52) U.S. Cl. ..................................... 439/701
(58) Field of Classification Search .............. 439/652, 439/456, 625, 701; 174/72 A, 97; 361/681, 361/826, 608; 710/305
See application file for complete search history.

(56) References Cited

U.S. PATENT DOCUMENTS

| 6,284,978 B1 * | 9/2001 | Pavillard et al. ............ 174/97 |
| 6,327,139 B1 * | 12/2001 | Champion et al. .......... 361/608 |
| 6,435,354 B1 * | 8/2002 | Gray et al. .................. 211/26 |
| 6,983,341 B1 * | 1/2006 | Lim et al. ................... 710/305 |
| 2001/0024904 A1 * | 9/2001 | Fischer ....................... 439/456 |
| 2003/0008563 A1 * | 1/2003 | Nishio et al. ................ 439/625 |
| 2003/0168238 A1 * | 9/2003 | Masuda et al. ............ 174/72 A |
| 2004/0079711 A1 * | 4/2004 | Hartman et al. ............. 211/26 |
| 2007/0086153 A1 * | 4/2007 | Martin et al. ............... 361/681 |

* cited by examiner

*Primary Examiner*—Chandrika Prasad
(74) *Attorney, Agent, or Firm*—O'Melveny & Myers LLP (57) ABSTRACT

A connectivity hub enabling multiple peripheral devices to be connected with a computer includes an integrated clip adapted to grip cables and to grip an edge of a work surface, thereby reducing cable clutter and providing for a more efficient use of work surface space. The connectivity hub includes a curved portion manufactured from a flexible and springy material, enabling a user to apply pressure to increase the distance between two edges of the clip in order to insert cables into the clip or to slide the clip over an edge of a work surface, or both.

14 Claims, 5 Drawing Sheets

CONNECTIVITY HUB WITH AN INTEGRATED CLIP

RELATED APPLICATION DATA

This application claims the benefit, pursuant to 35 U.S.C. § 119(e), of U.S. provisional application Ser. No. 60/868,258, filed Dec. 1, 2006.

BACKGROUND OF THE INVENTION

1. Field of the Invention

The present invention relates generally to a connectivity hub, such as a Universal Serial Bus ("USB") hub, enabling a computer to attach to multiple peripheral devices, and more particularly to a connectivity hub with an integrated clip for attaching the connectivity hub to other surfaces and/or holding cables.

2. Description of Related Art

In many applications, it is advantageous to interconnect a single computer port to multiple peripheral devices. A connectivity hub provides a convenient central data connection point for attaching multiple peripheral devices to a computer. The hub relays data from the computer to all enabled devices connected to the data hub, and relays data from the enabled devices to the computer. This data relay can be performed without any data storage or significant delay. The connectivity hub can be connected to the computer via a single upstream connector. The connectivity hub can include a plurality of downstream ports for connecting peripheral devices to the hub. Some common examples of connectivity hubs include FireWire hubs and USB hubs. Both USB and FireWire hubs utilize standardized connectors at the upstream and downstream ports to provide universal connectivity between peripheral devices and the computer, thus simplifying these connections.

Many connectivity hubs receive power for low power applications via a positive voltage conductor and a ground conductor from a source, such as the computer, through the upstream port. Conventional connectivity hubs can also be equipped with a connector for connecting with a transformer plugged into a typical AC outlet for providing DC power to the hub for high power applications.

One example of a connectivity hub is a USB hub. The USB standard is a communication interface standard that enables data transmission/reception between a single USB host and a plurality of USB devices. USB standard compliant interfaces have been widely used as a communication interface that mainly defines a PC as the USB host and its peripheral devices as the USB devices to enable connection between the PC and the peripheral devices. The USB standard adopts a star-shaped logical bus topology in which a single USB host is connected with plural USB devices. The USB 2.0 standard defines three bus transport speeds: a low speed ("LS") of 1.5 Mbit/s, a full speed ("FS") of 12 Mbit/s, and a high speed ("HS") of 480 Mbit/s. Most USB 2.0 hubs are backward compatible to the USB 1.1 standard that includes the LS and FS bus transport speeds.

Connectivity hubs are available in a variety of sizes and with a varying number of ports that can be utilized. One method of saving space and securely attaching a hub to a surface is by the use of an integrated magnet on one side of the hub. This solution allows the hub to be mounted to the side of metallic enclosures such as computer cases, thus allowing the hub to be moved off workspace areas like a desktop. Of course, this solution is limited to steel- and iron-type surfaces. Another solution available currently is the use of self-adhesive foam tape or hook-and-loop-type fasteners that are applied to one side of the hub and to a surface the hub will be attached to with glue or self-adhesive tape. These methods are not permanent and when the adhesive is removed, the surfaces contacting the adhesive often become marred.

When hooked-up for use, connectivity hubs have a plurality of cables that attach to the ports on the hub. Small portable hubs often meant to be used with a laptop computer and commonly referred to as "travel hubs" have the additional factor to deal with of managing all the disconnected cables that can create clutter in the user's computer bag, backpack, suitcase, etc. An easy-to-use method of storing the cables integrated with a hub would improve the user's experience by saving time in setting up the hub after traveling.

Some travel hubs have small clips on one side to enable the hub to be attached to a bag, briefcase or purse during travel, similar to the keychain clips on USB flash memory drives or clips similar to the pocket clip on a ball point pen; however, this solution doesn't fully address the shortcomings of existing connectivity hubs described in the preceding paragraphs.

Accordingly, there is a need for an improved connectivity hub design and solution to free-up space on the working area of the user's desktop with respect to placement of a connectivity hub.

SUMMARY OF THE INVENTION

Improved cable organization and more efficient utilization of work space are achieved with a connectivity hub that includes an integrated clip adapted to store and secure cables and to clamp the hub to the edge of a work surface. In the discussion that follows, embodiments of the connectivity hub are described, making reference to USB port connectors. However, it should be appreciated that FireWire ports, other serial data ports, parallel ports, power ports, and other ports adapted for connecting peripheral devices to a computer are all within the spirit and scope of this invention. In one embodiment of the invention, the connectivity hub provides a data and a power connection between a USB port on a computer and a plurality of USB peripheral devices. The top and back surfaces of the hub are adapted to fix in place one or more USB connectors that may be configured as upstream connectors, suitable for connection to a computer, or as downstream connectors, suitable for connection to peripheral devices. The USB connectors may be configured as standard "A"-type USB connectors or as standard "B"-type USB connectors, well known to those skilled in the art. Power for the connected peripheral devices may be provided by the computer through certain conductors in an upstream USB port routed through circuitry internal to the connectivity hub to conductors in the downstream USB ports. Alternatively, for higher power applications, the downstream peripheral devices may be powered by an external power supply that supplies power to the hub via a power connector on the hub that is routed through circuitry internal to the hub to conductors in the downstream USB ports.

In an embodiment of the invention, the circuitry and the plurality of ports are contained within a housing that comprises a substantially flat top surface connected to a front edge, a back surface connected to the top surface, and a curved portion connected to the back surface that terminates in an edge portion. The central portion of the curved surface may be cut away starting at a location near the back surface and extending through the edge portion, such that the edge portion is divided into a left edge portion and a right edge portion, much like two tines of a fork. The curved portion is manufactured from a flexible and springy material such that when pressure is applied to the left and right edge portions, the curved portion flexes and opens up, increasing the volume enclosed by the curved portion. When pressure is released from the left and right edge portions, the curved portion substantially springs back to its original shape, in which the left and right edge portions sit approximately one inch from the front edge attached to the top surface in the preferred embodiment. Of course, this distance can be adjusted within the spirit and scope of the present invention to accommodate varying user requirements.

The flexible curved portion of the connectivity hub serves at least two purposes. The first is to allow the hub to be fixed in place on an edge of a work surface, such as a table or desk, or to be clamped onto other convenient surfaces, such as a chair. By applying pressure to the left and right edge portions, a user can increase their distance from the front portion, allowing the user to slide the hub over an edge of a work surface or other convenient surface. When the user releases the pressure on the left and right edge portions, the curved portion will cause the edges to spring back into place, clamping the hub to the edge of the work surface, much like a C-clamp. The second purpose is to allow cables to be held within the volume enclosed by the curved portion and thus held out of the way of the user. The cables held within the volume enclosed by the curved portion may be cables currently in use and connected to the plurality of port connectors on the connectivity hub, or they may be extra cables, conveniently coiled for storage. The user would insert cables into the volume defined by the curved portion by inserting them between the front portion and left and right edge portions. The curved portion would flex during this process if necessary to accommodate the insertion of a large cable bundle. Depending upon how much room is taken up by inserting cables into the volume defined by the curved portion of the connectivity hub, the connectivity hub could both grip cables and grip the edge of a work surface, thereby moving both the hub and the cables out of the way of a user.

Besides gripping cables extending longitudinally through the volume defined by the curved portion, the connectivity hub can also accommodate cables exiting the volume through the cutaway portion of the curved portion. This allows the user to grip cables running both longitudinally though the volume defined by the curved portion as well as cables running in a direction perpendicular to the first set of cables. To further secure the perpendicular cables, the connectivity hub may optionally include an additional cable clip situated near the cutaway region of the curved portion to hold such cables in place.

A more complete understanding of the connectivity hub with an integrated clip, providing improved cable organization and more efficient use of workspace will be afforded to those skilled in the art, as well as a realization of additional advantages and objects thereof, by consideration of the following detailed description of the preferred embodiment. For purposes of convenience and clarity, the preferred embodiment is described with reference to USB port connectors. However, it should be appreciated that FireWire ports, other serial data ports, parallel ports, power ports, and other ports adapted for connecting peripheral devices to a computer are all within the spirit and scope of this invention. Reference will be made to the appended sheets of drawings which will first be described briefly.

DETAILED DESCRIPTION OF THE PREFERRED EMBODIMENT

The present invention provides a connectivity hub with an integrated clip for attaching the hub to surfaces and/or managing cables. For example, the connectivity hub can be clipped to the edge of a desktop or clipped to a group of cables running behind a user's desk. In the detailed description that follows, like element numerals are used to indicate like elements appearing in one or more of the figures.

Figure 1:
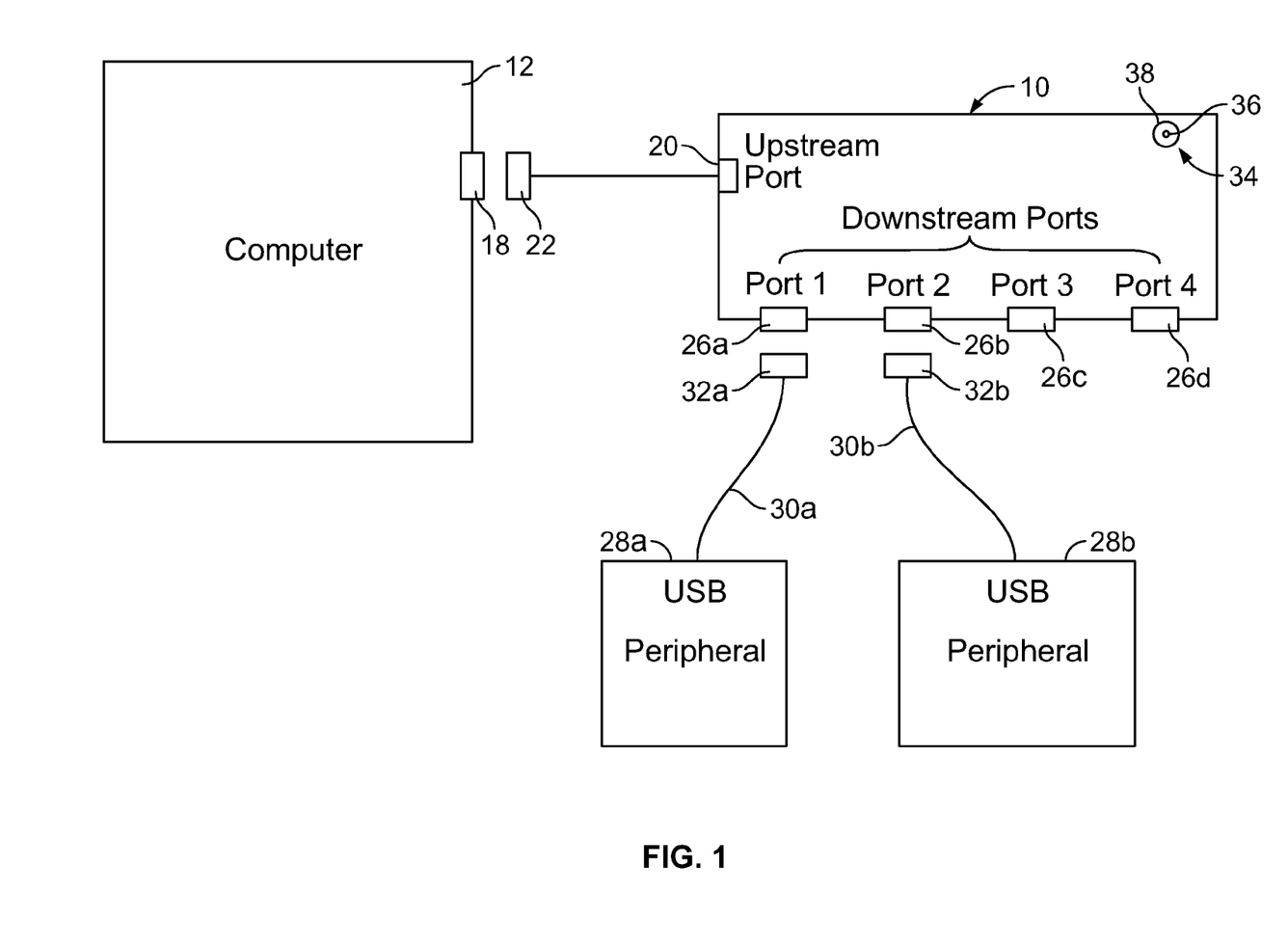
FIG. 1 is a block diagram illustrating a conventional connectivity hub.

FIG. 1 is a block diagram illustrating the connection of a conventional connectivity hub 10 to a computer 12. For purposes of illustration, a USB hub is described. The computer 12 has a USB interface that includes a master data hub for receiving data from the connectivity hub 10. The computer 12 includes at least one USB port connector 18. The connectivity hub 10 includes an upstream port connector 20 having a corresponding USB plug 22 that connects to the USB connector 18 of the computer 12.

The connectivity hub 10 also includes a plurality of downstream USB port connectors 26a-26d to permit multiple USB peripheral devices 28a and 28b, such as a keyboard, mouse, scanner, or printer, to be coupled to the computer 12 through the connectivity hub 10. The USB peripheral devices 28a and 28b are each connected by cables 30a and 30b to USB plugs 32a and 32b, which mate with the downstream port connectors 26a-26d of the connectivity hub 10.

In one embodiment of the present invention, the connectivity hub 10 contains connections for receiving power in two ways. First, the connectivity hub is bus powered for applications in which total current provided to the hub is less than approximately 500 mA. In bus powered applications, the connectivity hub receives power through the upstream port 20 from the USB plug 22 that contains separate positive and ground conductors. The connectivity hub can transfer a limited amount of current, approximately 100 mA, to each of four devices through the downstream ports via positive and ground conductors in the downstream port connectors 26a-26d.

The connectivity hub 10 also includes a separate power connector 34 for receiving sufficient power to supply the higher current demands to the downstream ports in high power applications. The available current draw through the downstream ports in such powered applications is approximately 500 mA per port. The power connector 34 includes a positive voltage conductor 36 and a ground conductor 38 for receiving DC voltage, preferably 5 volts, from a typical transformer (not shown) connected to an AC powered outlet (also not shown). The specific current levels specified above illustrate an exemplary difference between two operating modes, but it should be appreciated that other current sourcing capabilities fall within the scope and spirit of the invention.

Figure 2:
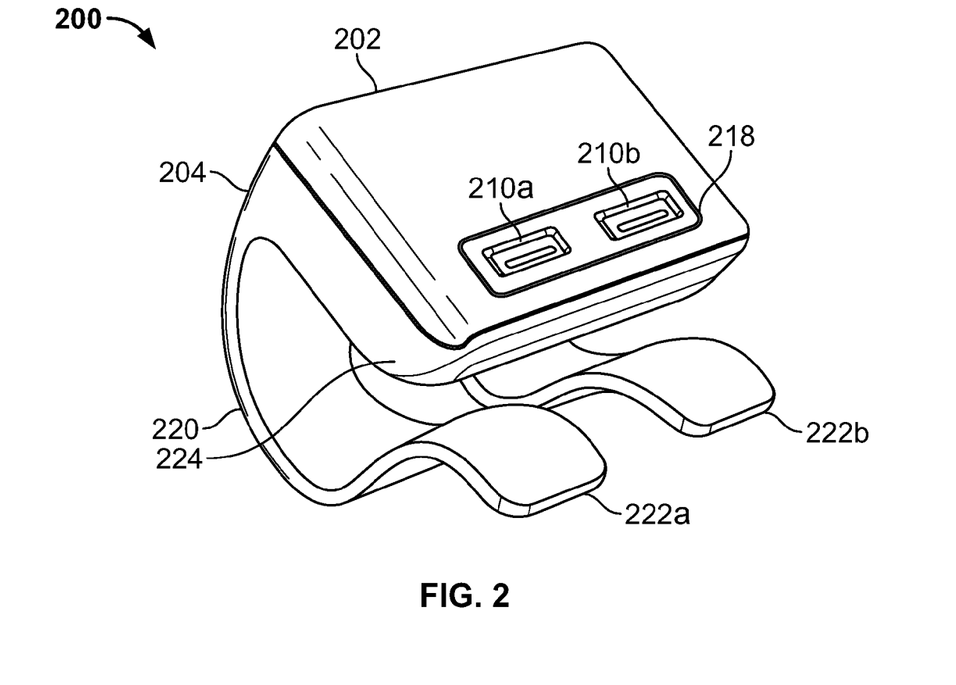
FIG. 2 is a perspective view of an exemplary embodiment of a connectivity hub employing USB connectors with an integrated clip in accordance with the present invention.

FIG. 2 is a perspective view of an exemplary embodiment of a connectivity hub 200 with an integrated clip in accordance with the present invention. For convenience, the connector ports shown are USB ports, although it should be appreciated that other types of connectivity ports fall within the scope and spirit of the present invention. In one embodiment of the present invention, the connectivity hub 200 comprises a clip 204, a top surface 202, a connector bezel 218, two USB jacks 210a and 210b, a curved portion 220, edges 222a and 222b, and a front edge 224. The connectivity hub 200 electrically operates as a conventional USB hub, with USB jacks 210a and 210b comprising USB type "A" downstream ports. In this embodiment, USB jacks 210a and 210b are USB 2.0 ports and are downward compatible with the USB 1.1 protocol. Connection cables from USB port 210a and 210b can be attached to USB peripheral devices such as a keyboard, mouse, printer, digital camera flash memory drive, etc. (not shown). The connectivity hub 200 can be used as a powered hub, receiving power through connectors for an external power supply, or as a non-powered hub, receiving power through an upstream USB port that is coupled to a computer. The external power connector, the upstream ports, and additional downstream ports are visible in FIGS. 3 and 4 and are described further below. It should be appreciated, however, that the present invention is not limited to a connectivity hub that includes USB connectors in the configurations illustrated in FIGS. 3 and 4. It should be appreciated that a connectivity hub that, for example, includes additional surfaces and jacks and/or does not include a bezel is within the spirit and scope of the present invention.

In one embodiment of the present invention, the curved portion 220 is constructed of a flexible material that allows the spacing between the edges 222a, 222b and the front edge 224 to be increased when a user applies downward pressure on the edges 222a, 222b, away from the stationary front edge 224. The spacing then returns to approximately the original gap when the pressure is released, in effect acting like a spring (as long as the pressure applied does not exceed the maximum force that causes the curved portion 220 to permanently deform beyond the original shape of the integrated clip 204). This allows the integrated clip 204 to grasp things such as the edge of a desktop between the convex edges 222a, 222b and the front edge 224, that together act like a set of jaws of a vice or a C-clamp. The application of pressure to the edges 222a, 222b causes the space between edges 222a, 222b and front edge 224 to increase temporarily so that cables with a diameter greater than the space can be inserted into the curved portion 220 of the integrated clip 204 (illustrated in FIGS. 3, 6a, and 6b) and/or the clip 204 can be slid over the edge of a desktop or other work surface (discussed further below with regard to FIG. 5).

In the embodiment shown in FIG. 2, the clip 204 edges 222a, 222b are curved; however, one skilled in the art will recognize that in other embodiments the edges 222a, 222b can be curved less or more than as shown or even have no curve, though that will likely effect the springiness of the edges 222a, 222b and in turn the amount of force required to separate the edges 222a, 222b from the front edge 224. Other variations can include a different number of edges 222a, 222b on the clip 204.

Figure 3:
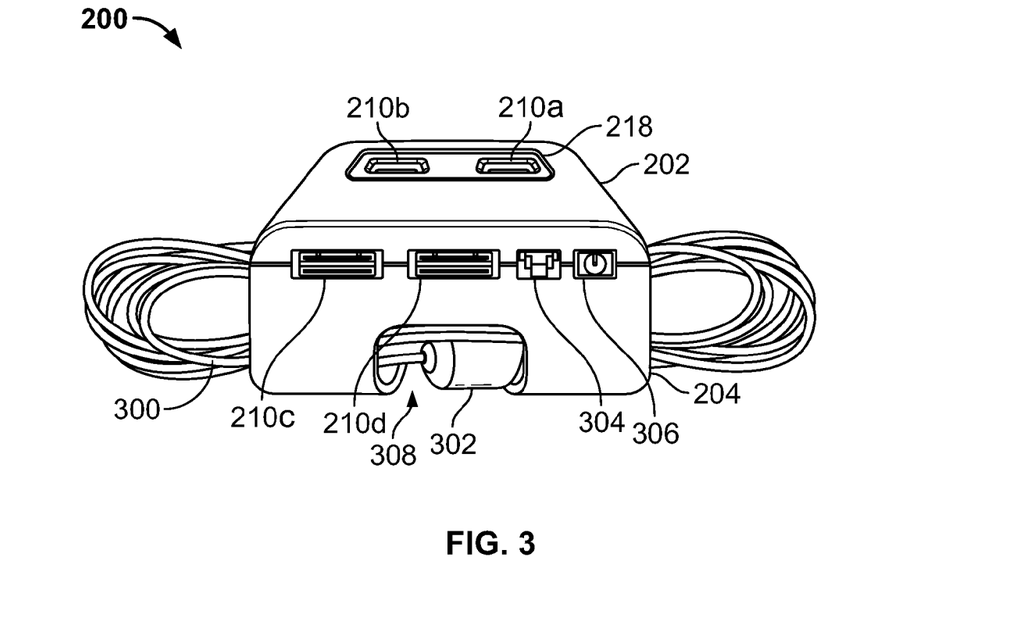
FIG. 3 is a rear perspective view of an exemplary embodiment of the connectivity hub employing USB connectors with an integrated clip in accordance with one embodiment of the present invention.

FIG. 3 is a rear perspective view of an exemplary embodiment of the connectivity hub 200 with the integrated clip 204 in accordance with the present invention. Visible on the back portion of the integrated clip 204 are additional USB jacks 210c and 210d, a type "B" USB jack 304, a power connector 306, a coiled cable 300, and cable plug 302. One skilled in the art will recognize that the number and placement of the downstream USB jacks can vary and is not limited to the four USB jacks 210a-210d illustrated in this embodiment. That is, the USB jacks 210a-210d can be placed on different sides of the connectivity hub 202 and in a different pattern or layout on a particular side. Furthermore, one skilled in the art will recognize that other types of ports used to connect devices to a computer, other than USB ports, are within the scope and spirit of the present invention. USB jack 304 is preferably an upstream port used to connect a type "B" USB plug, wherein a cable is coupled from USB jack 304 to a master data hub inside an external computer (not shown). It should be noted that USB jack 304 can also be coupled to a downstream port of another connectivity hub so that multiple hubs are interconnected in a "daisy-chain" fashion. The USB peripherals coupled to the connectivity hub 200 are coupled to the USB jack 304 by the internal circuitry (not shown) of the connectivity hub 200. Coiled cable 300 and cable plug 302 can be extra cables not currently connected to the connectivity hub 200, such as when the connectivity hub 200 is being transported to another location. Alternatively, if a particular USB cable is longer than needed to reach a USB peripheral device, the extra slack can be removed by coiling the cable in the integrated clip 204.

Figure 4:
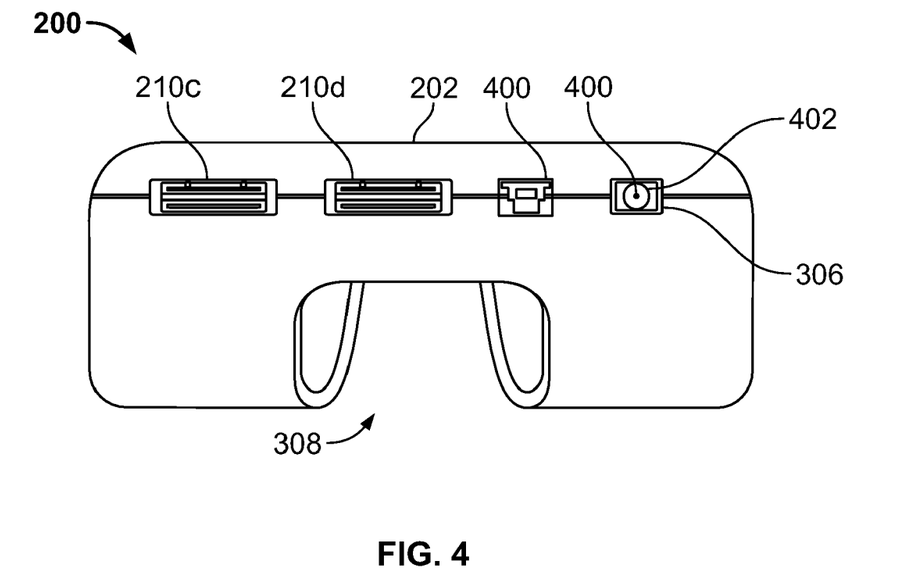
FIG. 4 is a rear elevational view of the connectivity hub with an integrated clip in accordance with one embodiment of the present invention.

FIG. 4 is a rear elevational view of the connectivity hub 200 with an integrated clip 204 in accordance with an embodiment of the present invention. In this illustration, the details of power connector 306 are visible. Power connector 306 includes a positive voltage connector 400 and a ground connector 402 for providing DC voltage, preferably 5 volts, from a conventional source such as an AC power transformer (not shown) connected to a 120 v AC wall outlet. The power connector 306 may be any type of power connector known in the art. The positive and ground connectors 400 and 402 are connected to the internal circuitry (not shown) of the connectivity hub 200 so as to provide power to the connectivity hub 200 for high power applications when more than the typical 100 mA current available in the bus powered mode is required. Also visible in FIG. 3 is cutaway 308. Cutaway 308 is an area of the clip 204, the curved portion 220, and the edges 220a and 220b, that has been removed or "cut away" from the solid material comprising these portions of the connectivity hub 204. In the embodiment shown in FIG. 3, cutaway 308 is roughly rectangular in shape. A better understanding of cutaway 308 can be realized by reviewing cutaway 308 in FIG. 2, where cutaway 308 is visible from another angle. The use of cutaway 308 serves several purposes. First, the weight of the connectivity hub 200 is reduced. Second, the use of cutaway 308 causes edges 222a, 222b (see FIG. 2) to be split into two separate edges so that less downward force by the user is required to separate convex edges 222a, 222b from front edge 224. Third, the convex edges 222a, 222b can each be separated by a different distance from front edge 224 so that integrated clip 204 can be applied to uneven or sloping surfaces, thereby allowing the connectivity hub 200 to be clipped onto more types of surfaces and at more varied angles than would be possible if the integrated clip 204 comprised one solid material.

Figure 5:
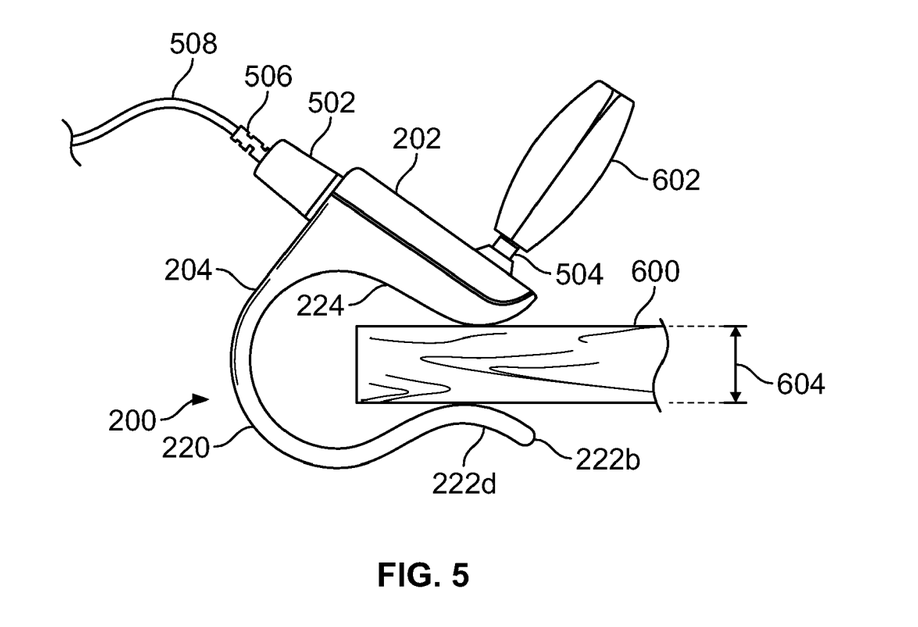
FIG. 5 is a perspective view illustrating the connectivity hub with an integrated clip attached to a desktop surface in accordance with one embodiment of the present invention.

FIG. 5 is a perspective view illustrating the connectivity hub 200 with an integrated clip 204 attached to an edge 600 in accordance with an embodiment of the present invention. In FIG. 5, a USB flash drive 602 with a USB connector 504 is operatively connected to one of the USB jacks 210a and 210b (see FIGS. 2 and 3) on the top surface 202. However, it should be appreciated that other devices, including those not using the USB protocol, could be connected to a connectivity hub in accordance with the present invention. On the back portion of the integrated clip 204 is an upstream USB plug 504 (shown in FIGS. 3 and 4, but not visible in FIG. 5) that comprises the cover 502, the strain relief 506, and the USB cable 508. The USB cable 508 is operatively connected to a master hub within a computer either directly or indirectly through one or more other connectivity hubs, as discussed above.

The integrated clip 204 can grasp the edges of desktops, tables, chairs, etc., and in the embodiment illustrated in FIG. 5, the thickness 604 has a distance of approximately one inch; however, one of ordinary skill in the art will recognize that the dimensions and materials of the integrated clip 204 can be altered so that the maximum thickness of an edge 600 can be increased or decreased accordingly. To get the integrated clip 204 to grasp the edge 600, the user applies downward pressure on edges 222a, 222b away from the edge 600, while holding front edge 224 stationary, then the user slides the integrated clip 204 over the edge 600.

Figure 6A:
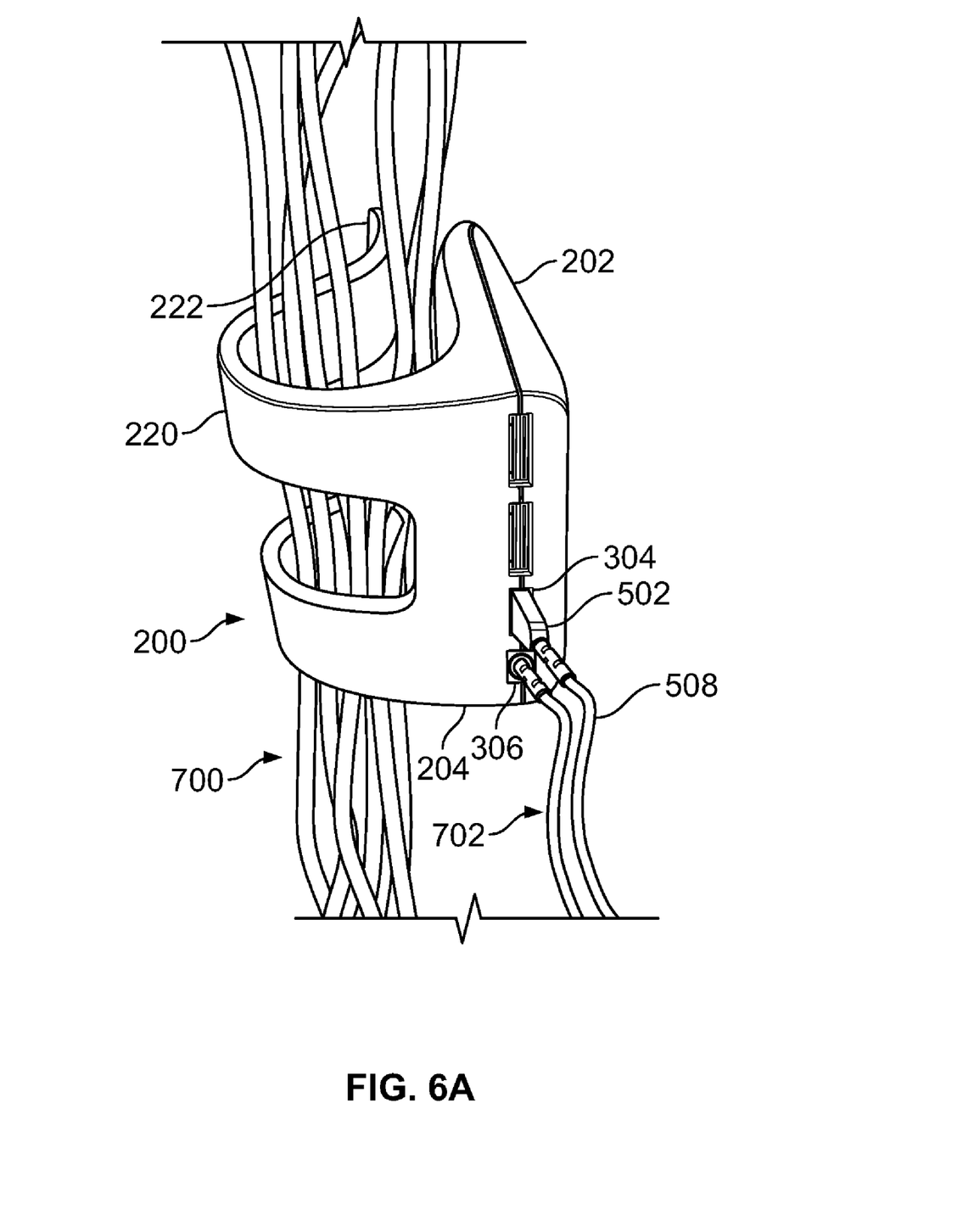
FIGS. 6A and 6B are different perspective views illustrating the connectivity hub with an integrated clip managing a plurality of cables in accordance with one embodiment of the present invention.
Figure 6B:
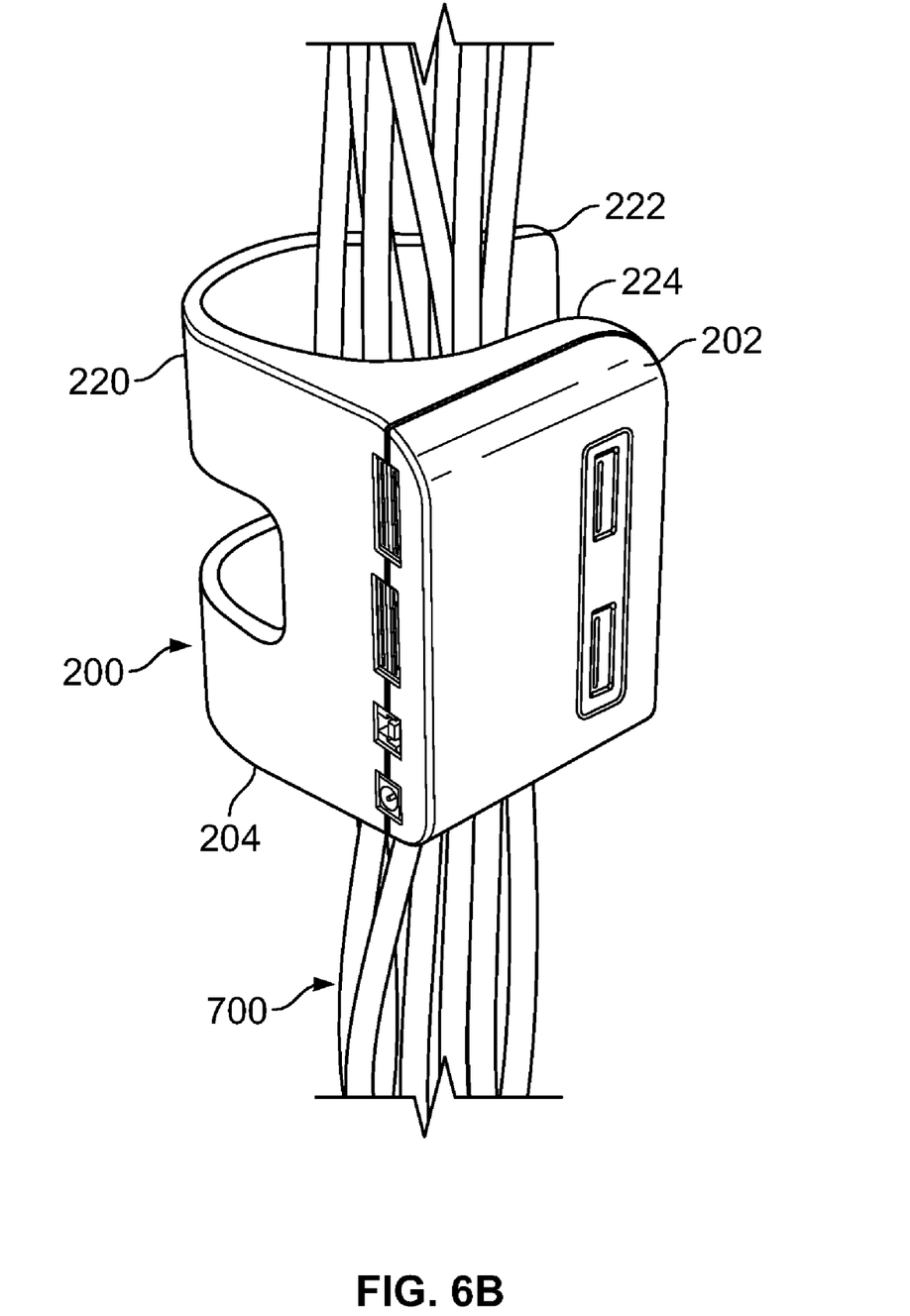

FIGS. 6A and 6B are different perspective views illustrating the connectivity hub 200 with an integrated clip 204 managing a plurality of cables 700 in accordance with an embodiment of the present invention. Visible in FIG. 6A is the cover 502 and the USB cable 508 connected to the USB jack 304 on the proximal end that operatively connects to a USB peripheral (not shown) on the distal end, as described above. Also visible in FIG. 6A is a power converter cable 702 that operatively connects to power connector 306 on the proximal end, as described above, to an AC power transformer on the distal end (not shown). The power converter cable 702 is used with high powered peripherals that draw more than the 100 mA-current-per-port limit for USB jacks 210a-210d operating in the bus powered mode, as discussed above with regards to FIG. 4.

FIGS. 6A and 6B both illustrate some of the possible uses of the integrated clip 204. First, the plurality of cables 700 can be contained within the concave portion 220 to manage these otherwise loose cables within the proximity of the user's computer. Second, the plurality of cables 700 can be placed within the concave portion 220 so as to affix the connectivity hub 200 in a stationary position off of the user's workspace. The integrated clip 204 can serve both of these purposes at the same time. That is, the integrated clip can be used to hold the connectivity hub 200 in a stationary position on the edge 600 and to manage the cables 700 so as to keep the cables 700 neat and orderly. The volume of the plurality of cables 700 is limited by the diameter of the individual wires, the diameter of the concave portion 220 and the thickness 604 (shown in FIG. 6). Although the diameter of the concave portion 220 is larger than the thickness 604, the limiting factor as to the number of wires that can be grasped by the integrated clip 204 is in most cases the thickness 604.

In another embodiment (not shown), the curved portion of the cable clip has a curved insert with one or more spokes like a bicycle wheel placed in the C-shape of the curved portion of the clip that enables cables that pass longitudinally through the clip (similar to the illustration of FIGS. 6A and 6B) to be held securely within the center of the body of the clip. One skilled in the art will recognize that the number, size of the spokes and the pattern may vary.

In yet another embodiment (not shown), the cutaway 308 (see FIG. 3) has a retaining clip running across the cutaway 308 so that the cable clip can retain wires that run through cutaway 308 perpendicular to the direction of the cables shown in FIGS. 6A and 6B.

In accordance with one aspect of the embodiments described herein, there is provided a connectivity hub comprising: a housing; a first side with one or more bus ports; a second side; and a clip integrated with one or more sides of the connectivity hub. The clip can secure the hub to an edge of a surface. The cables can be contained adjacent to the interior side of the clip. The housing can comprise: a top portion; a bottom portion opposite the top portion; a first side perpendicular to the top portion; and a second side parallel to the first side.

In one embodiment, the second side comprises one or more bus ports. The clip can have one or more edges that are in close proximity to the second side of the housing with a gap separating the surfaces. The one or more edges of the clip can be separated from the second side by the application of force on one or more of the edges in a direction away from the second side, thereby causing the gap to widen so that cables can be inserted along the interior side of the clip and/or an edge of a surface can be placed along the interior of the clip.

Having thus described a preferred embodiment of a connectivity hub with an integrated clip, it should be apparent to those skilled in the art that certain advantages of the invention have been achieved. For example, the use of the integrated clip to affix the connectivity hub to an edge of a desk has been illustrated, but it should also be appreciated that various modifications, adaptations, and alternative embodiments thereof may be made within the scope and spirit of the present invention. The invention is further defined by the following claims.

What is claimed is:

1. A connectivity hub comprising:
   a plurality of port connectors comprising at least one upstream port connector for connecting to a computer and at least two downstream port connectors for connecting to at least two peripheral devices; and
   a hub body supporting the plurality of port connectors in relation to at least one object, comprising:
      a front portion;
      a back portion; and
      a curved portion comprising a first end and a second end, wherein the first end of the curved portion is connected to the back portion of the hub body, the second end of the curved portion is proximate, but not connected to, the front portion of the hub body, and the second end of the curved portion secures the at least one object between the second end of the curved portion and the front portion of the hub body, thereby supporting the plurality of port connectors in relation to the at least one object.

2. The connectivity hub of claim 1, further comprising the at least one object, wherein the at least one object includes a top surface and a bottom surface, and the curved portion secures the at least one object by (i) flexing the second end of the curved portion away from the front portion of the hub body, (ii) moving the at least one object between the second end of the curved portion and the front portion of the hub body, and (iii) allowing the second end of the curved portion to spring toward the front portion of the hub body until the front portion of the hub body comes into frictional contact with the top surface of the at least one object and the second end of the curved portion comes into frictional contact with the bottom surface of the at least one object.

3. The connectivity hub of claim 2, wherein the at least one object comprises at least a portion of a workstation.

4. The connectivity hub of claim 1, wherein the hub body further comprises a second curved portion comprising a first end and a second end, wherein the first end of the second curved portion is connected to the back portion of the hub body, the second end of the second curved portion is proximate, but not connected to, the front portion of the hub body, and the second end of the second curved portion secures the at least one object between the second end of the second curved portion and the front portion of the hub body, thereby further supporting the plurality of port connectors in relation to the at least one object.

5. The connectively hub of claim 4, further comprising the at least one object, wherein the at least one object includes a top surface and a bottom surface, and the second curved portion secures the at least one object by (I) flexing the second end of the second curved portion away from the front portion of the hub body, (ii) moving the at least one object between the second end of the second curved portion and the front portion of the hub body, and (iii) allowing the second end of the second curved portion to spring toward the front portion of the hub body until the front portion of the hub body comes into frictional contact with the top surface of the at least one object and the second end of the second curved portion comes into frictional contact with the bottom surface of the at least one object.

6. The connectivity hub of claim 1, wherein each of the plurality of port connectors comprises at least one of a USB port, a FireWire port, a serial port, and a parallel port.

7. The connectivity hub of claim 1, wherein the hub body further comprises a top portion that is substantially flat, and fixes in place at least one of the plurality of port connectors.

8. The connectivity hub of claim 1, further comprising a power connector, wherein the hub body supports the power connector in relation to the at least one object.

9. A connectivity hub comprising:
a plurality of USB connectors comprising at least one upstream USB connector for connecting to a computer and at least two downstream USB connectors for connecting to at least two peripheral devices; and
a hub body supporting the plurality of USB connectors in relation to a workstation, comprising:
a front portion;
a back portion; and
a curved portion comprising a first end and a second end, wherein the first end of the curved portion is connected to the back portion of the hub body, and the second end of the curved portion secures at least a portion of the workstation between the second end of the curved portion and the front portion of the hub body, thereby supporting the plurality of USB connectors in relation to the workstation.

10. The connectivity hub of claim 9, further comprising the workstation, wherein the at least a portion of the workstation includes a top surface and a bottom surface, and the curved portion secures the at least a portion of the workstation by (i) flexing the second end of the curved portion away from the front portion of the hub body, (ii) moving the at least a portion of the workstation between the second end of the curved portion and the front portion of the hub body, and (iii) allowing the second end of the curved portion to spring toward the front portion of the hub body until the front portion of the hub body comes into frictional contact with the top surface of the at least a portion of the workstation and the second end of the curved portion comes into frictional contact with the bottom surface of the at least a portion of the workstation.

11. The connectivity hub of claim 10, wherein the hub body further comprises a second curved portion comprising a first end and a second end, wherein the first end of the second curved portion is connected to the back portion of the hub body, and the second end of the second curved portion secures the at least a portion of the workstation between the second end of the second curved portion and the front portion of the hub body, thereby further supporting the plurality of USB connectors in relation to the workstation.

12. The connectively hub of claim 11, wherein the second curved portion secures the at least one object by (i) flexing the second end of the second curved portion away from the front portion of the hub body, (ii) moving the at least a portion of the workstation between the second end of the second curved portion and the front portion of the hub body, and (iii) allowing the second end of the second curved portion to spring toward the front portion of the hub body until the front portion of the hub body comes into frictional contact with the top surface of the at least a portion of the workstation and the second end of the second curved portion comes into frictional contact with the bottom surface of the at least a portion of the workstation.

13. The connectivity hub of claim 12, wherein the hub body further comprises a top portion that is substantially flat, and fixes in place at least one of the plurality of USB connectors.

14. The connectivity hub of claim 12, further comprising a power connector, wherein the hub body supports the power connector in relation to the workstation.

* * * * *